Feb. 26, 1957     H. J. PASSINO ET AL     2,783,219
MANUFACTURE OF FLUORINE CONTAINING POLYMERS
Filed June 11, 1953
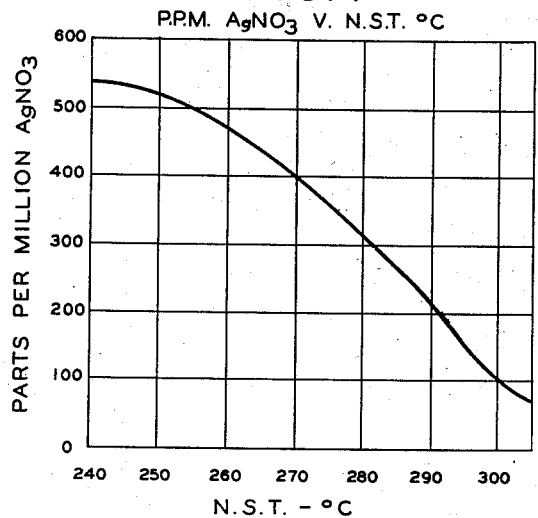
FIG. 1 — P.P.M. $AgNO_3$ V. N.S.T. °C
POLYMERIZATION OF $CF_2=CFCl$ USING PERSULFATE-BISULFITE (0.074 MULAR) AT 10°C
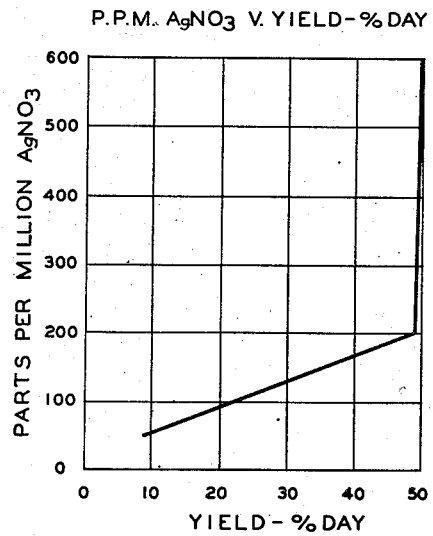
FIG. 2 — P.P.M. $AgNO_3$ V. YIELD-% DAY
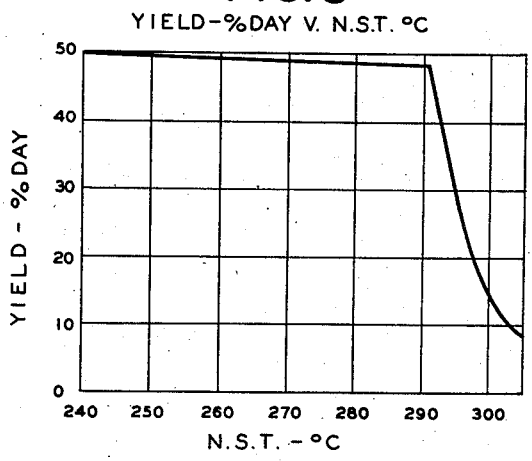
FIG. 3 — YIELD-% DAY V. N.S.T. °C
INVENTORS
ALBERT L. DITTMAN
HERBERT J. PASSINO
JOHN M. WRIGHTSON
BY
ATTORNEYS

United States Patent Office 2,783,219
Patented Feb. 26, 1957

2,783,219

MANUFACTURE OF FLUORINE CONTAINING POLYMERS

Herbert J. Passino, Englewood, and Albert L. Dittman, North Bergen, N. J., and John M. Wrightson, Whittier, Calif., assignors to The M. W. Kellogg Company, Jersey City, N. J., a corporation of Delaware Application June 11, 1953, Serial No. 360,891

2 Claims. (Cl. 260—92.1)

This invention relates to a method of manufacturing fluorinated plastics. In one of its aspects, this invention relates to a method for polymerizing fluorochloroolefins to produce a normally solid polymer. In another of its aspects, this invention relates to the polymerization of perfluorochloroolefins in an aqueous-suspension medium to produce a normally solid polymer. In one of its more particular aspects, this invention relates to the polymerization of trifluorochloroethylene in a persulfate, bisulfite promoted aqueous system accelerated with silver ion to produce a normally solid, thermoplastic polymer.

The present invention is a continuation-in-part of our prior and copending application Serial No. 213,524 filed March 2, 1951, Patent Number 2,689,241, which application discloses polymerization of halogenated olefins in aqueous systems.

The polymerization of fluorochloroolefins results in the production of a variety of useful materials. For example, the polymerization of trifluorochloroethylene under conditions suitable for the production of the solid polymer, yields a material of extraordinary chemical resistance and desirable physical characteristics. The chemical resistance of polytrifluorochloroethylene is such that it will withstand exposure to a wide variety of oxidizing, reducing and solvent type materials such as fuming nitric acid, hydrazine, acetone, aniline, etc. Physically, the material possesses high thermal stability, tensile strength, etc. In addition to the above properties, these polymers are readily molded into various useful articles, such as valves, diaphragms, gaskets, etc., using conventional equipment with operating conditions adjusted in accordance with the characteristics of the polymer.

The present method for producing solid polytrifluorochloroethylene is by a bomb or mass-bulk type reaction at relatively low temperature. The polymerization is effected, under suitable polymerization conditions, with or without the presence of a suitable catalyst or promoter. Such conditions comprise the use of a suitable catalyst, such as bis-trichloroacetyl peroxide disolved in a suitable solvent, such as trichlorofluoromethane, at a temperature between about —20 and about 50° C. After a period of about 7 days the bomb is opened and a porous-plug containing monomer within the interstices of the plug is removed. The monomer is evaporated and the plug is broken into chips or granules for further processing.

It is an object of this invention to provides a process for polymerizing fluorochloroolefins, to product normally solid polymer in relatively high yields.

Another object of this invention is to provide a process in which polymerization of fluorochloroolefins may be effected in relatively short periods of time and in good yields from an economic standpoint.

Another object of this invention is to provide an accelerator for increasing the yield of polymer and decreasing the time of polymerization.

It is one of the more particular objects of this invention to provide a process for producing normally solid polytrifluorochloroethylene having a no strength temperature (N. S. T.) above about 220° C. in high yields.

Various other objects and advantages of the present invention will become apparent to those skilled in the art from the accompanying description and disclosure.

As herein defined, polymerization refers to the polymerization of a single monomer and also to the copolymerization of unlike monomers to produce polymers and copolymers.

According to this invention, a substituted ethylene containing at least two fluorine atoms, preferably at least one fluorine atom per carbon atom of the aliphatic portion of the substituted ethylene, is polymerized in the presence of an aqueous-suspension medium under suitable conditions of temperature, pressure, residence time and promoting agent to produce a normally solid thermoplastic polymer. The polymerization process of this invention may be effected in either a batchwise or continuous manner. The monomer is admixed with the aqueous-suspension medium in a suitable polymerization zone which is maintained at the appropriate conditions of polymerization and under sufficient pressure to maintain the aqueous solution as a liquid under the conditions of polymerization. The monomer and water are agitated by suitable means in the reaction zone so as to intimately disperse the monomer and aqueous-suspension medium. The monomer and polymer are substantially insoluble in the aqueous dispersion medium. The separation of the polymer from the water phase may be effected by settling and decantation, by filtering, by centrifuging, by evaporation, or by various other conventional methods.

The present invention is particularly applicable to the polymerization of perfluorochloroolefins, such as trifluorochloroethylene. However, the invention contemplates the polymerization of various halogenated olefins. For example, perfluorobutadiene, perfluoropropene, phenyltrifluoroethylene, alpha methyl phenyl difluoroethylene, perfluoroacrylonitrile, perfluorostyrene, perfluorocyclobutene, perfluorocyclobutadiene, tetrafluoroethylene, vinylidene fluoride, trifluoroethylene and difluorodichloroethylene. As previously mentioned, the invention applies to the copolymerization of these monomers, as well as their homopolymerization. For example, the invention applies to the copolymerization of trifluorochloroethylene and tetrafluoroethylene, of trifluorochloroethylene and vinylidene fluoride, trifluorochloroethylene and vinyl fluoride, trifluorochloroethylene and vinylidene chloride, trifluorochloroethylene perfluoropropene, trifluorochloroethylene and trifluoroethylene, and of perfluorobutadiene and perfluorostyrene. In these copolymerizations, the second monomer is also preferably a fluorinated olefin and preferably contains at least two fluorine atoms per molecule. When less than 5 weight percent comonomer is employed, the polymerization is broadly included within the term homopolymerization.

The quantity of water employed as the aqueous-suspension medium is usually between about 0.05 to about 10 times by volume of the quantity of total monomer present in the reaction zone. Preferably, the quantity of water is between one and five times the total monomer in the reaction zone.

The temperature employed for the polymerization will depend to a certain extent upon the particular monomer being polymerized. While the temperature may be varied depending upon the type of monomer, it is critical that the temperaure be maintained below about 20° C. Temperatures above 20° C. result in the production of non-thermoplastic polymers, i. e. waxes and oils, depending on the extent to which the temperature has been raised above 20° C. As the temperature is decreased the reaction time increases. Obviously, temperatures substantially below about 0° can not be used. Therefore, this invention contemplates a temperature range above about 0° C. and below 20° C. In the polymerization of trifluorochloroethylene, temperatures between about 5° C. and about 15° C. are preferred. Still more preferable, are temperatures between about 8° C. and about 13° C. while a particularly suitable temperature is about 10° C.

The time of polymerization also depends upon the monomer being polymerized, but in general, times between about 10 minutes and about 72 hours may be employed. A preferred polymerization time is between about 5 and about 50 hours, usually 20 to 35 hours.

The aqueous phase type of polymerization for the above monomers usually requires a suitable promoting agent for effecting the polymerization in a reasonable length of time and to produce a polymer of the desired molecular weight. These promoting agents fall in three general classes; promoters, activators and accelerators. In almost all instances, a promoter must be used. Such promoters comprise the inorganic peroxides. Examples of suitable inorganic peroxides are the water soluble peroxides, such as the perborates, persulfates, perphosphates, percarbonates, barium peroxide, zinc peroxide, and hydrogen peroxide. Particularly valuable are the water soluble salts of the peracids, such as sodium, potassium, calcium, barium and ammonium salts of persulfuric and perphosphoric acids which may be prepared in the conventional manner by electrolytic oxidation of salts of the corresponding oxy acids. Suitable concentrations of the promoter lies within the range of 0.003 molar to about 0.1 molar. The exact quantity of promoter will depend upon the monomer, molecular weight of the polymer desired and the particular promoter being employed. For example, in the polymerization of trifluorochloroethylene to produce the solid polymer thereof having an N. S. T. above 220° C., a promoter concentration between about 0.003 and about 0.07 molar, or about 0.01 and about 2 percent by weight based on water, is preferred. Generally, the concentration is not higher than about 0.09 molar.

Promoters are also preferably used in conjunction with an activator. Such activators comprise sodium bisulfite, sodium hydrosulfite, sodium thiosulfate and trimethylamine, and in general any water soluble reducing agent. These activators are generally employed in concentrations similar to the concentration of promoter employed. Equimolar amounts of promoter and activator are preferred.

Buffering agents may be employed also to obtain optimum pH conditions. For example, when an alkaline pH is desired, buffers such as borax, disodium phosphate, sodium carbonate, ammonium carbonate, and sodium acetate may be used. For an acid pH, acetic acid, propionic acid and monosodium phosphate may be employed. It is preferred to maintain a pH between about 1 and about 4.

It has been found that high yields of polymer may be obtained in relatively short periods of time by the use of water soluble silver salts. These water soluble silver compounds, or accelerators, ionize in water to produce silver ion. The accelerator in its oxidized state is more readily reducible than the promoter and in its reduced state is more readily oxidizable than the activator. Various water soluble salts of silver may be employed, such as for example silver nitrate, silver sulfate, silver carbonate, etc. A particularly suitable silver compound is silver nitrate. The silver compound is dissolved in the aqueous reaction mixture and is present in an amount between about 1 and about 2000 p. p. m., calculated as silver. Usually, the concentration will not exceed about 1000 p. p. m. In the homo-polymerization of trifluorochloroethylene, it is preferred to use between about 3 and about 300 p. p. m. of silver salt calculated as silver. At relatively low temperatures between about 150 and about 300 p. p. m. are preferred. At higher temperatures the concentration of silver accelerator is preferably kept between about 3 and about 150 p. p. m. calculated as silver since high temperatures combined with high silver ion concentration tend to produce non-thermoplastic polymers, i. e. oils and waxes. In the production of co-polymers, the required silver accelerator concentration may be as high as 1000 p. p. m.

It is preferred to maintain the water phase substantially free from water soluble organic compounds, such as alcohols and ketones, since such compounds are inhibitors for the polymerization of trifluorochloroethylene and have a marked adverse affect on the polymerization reaction and on the characteristics of the product produced. The use of purified or distilled water is thus preferred.

In carrying out the process of this invention using an accelerator, the polymerization is effected in a vessel or conduit which is not capable of being attacked by the ingredients employed in the polymerization. Suitable corrosion resistant materials useful for construction or lining of the reaction vessel or conduit comprise stainless steel, Inconel, Monel, silver, nickel, glass or fluorinated solid polymers. In all cases, the liquid in the reaction zone must be vigorously agitated to maintain the reactant and promoting agents in intimate contact. The vigorous agitation of the liquid phase of the reactor may be obtained by high speed stirring, such as with small propellers connected by means of a shaft to a high speed electric motor. Forced circulation of the liquid phase through orifices or small diameter conduits is also an effective method for achieving intimate mixing of the reactant, water and promoting agents. In general, any system suitable for obtaining a mechanical emulsion without using detergents will be applicable since, in most instances, detergents are harmful to the polymerization reaction.

It is within the scope of this invention to disperse finely-divided solids in the liquid phase as a suspension for the purpose of acting as fillers for the polymer product and for the purpose of forming nuclei for the start of the polymerization. The following examples of such fillers: various pigments such as titanium dioxide, carbon black, clays, asbestos, glass fiber, and other relatively inert solids.

A series of polymerization runs were made in order to more clearly show the effect on the yield and on the no strength temperature of polymer resulting from variation in temperature and accelerator concentration. These data are presented in the table below. All runs were made using a 16.2 to 1 mol ratio of water to monomer. Equimolar concentrations of potassium persulfate and sodium bisulfite were used. 0.074 molar concentrations of potassium persulfate and sodium bisulfite were used in all cases except those indicated by an asterisk where 0.0185 molar concentrations were employed. Accelerator concentration is given in p. p. m. of silver nitrate for convenience; concentration in terms of silver may be readily calculated. The polymerization time ranged between 43 and 46 hours.

TABLE 1

*Tabulated data*

Tabulated data

| Run No. | Temp., °C. | Percent Yield | Percent/ Day | N. S. T., °C. | Percent $K_2S_2O_8$ Remaining | P. P. M. AgNO$_3$ |
|---|---|---|---|---|---|---|
| 1 | 27-31 | 9.5 | 12.0 | | 81.1 | 5 |
| 2 | 27-31 | 9.84 | 11.2 | | 89.2 | 50 |
| 3 | 27-31 | 89.3 | 113.0 | (a) | 75.7 | 500 |
| 4 | 20 | 12.6 | 6.58 | 290 | 83.8 | 1 |
| 5 | 20 | 11.06 | 5.8 | | 79.7 | 5 |
| 6 | 20 | 23.2 | 12.1 | 283 | 89.2 | 50 |
| 7 | 20 | 82.6 | 43.1 | (a) | 78.4 | 500 |
| 8 | 20 | 85.4 | 44.6 | (a) | 67.6 | 1,000 |
| 9* | 20 | 83.4 | 43.5 | (a) | 70.3 | 500 |
| 10 | 10 | 1.45 | 0.79 | | 68.9 | 1 |
| 11 | 10 | 1.70 | 0.93 | | 71.6 | 5 |
| 12 | 10 | 4.67 | 2.55 | | 73.0 | 50 |
| 13 | 10 | 80.2 | 43.8 | 255 | 67.5 | 500 |
| 14 | 10 | 85.0 | 46.4 | (a) | | 1,000 |
| 15* | 10 | 80.0 | 43.7 | 280 | 81.0 | 500 |
| 16 | 10 | 4.1 | 2.29 | | 77.7 | 10 |
| 17 | 10 | 42.0 | 23.4 | 299 | 79.1 | 100 |
| 18 | 10 | 87.1 | 48.6 | 292 | 82.4 | 200 |
| 19 | 10 | 89.0 | 49.7 | 266-277 | 77.7 | 300 |
| 20 | 10 | 88.8 | 49.6 | 283 | 73.6 | 400 |
| 21* | 10 | 56.4 | 31.5 | 287 | 91.6 | 200 | a The N. S. T. could not be determined since the polymer produced was non-thermoplastic.

Figures 1, 2 and 3 of the drawings are presented to show the effect of silver nitrate accelerator concentration. Specifically, Figure 1 of the drawing shows the effect of increasing accelerator concentration on the N. S. T. of the produced polymer, while Figure 2 of the drawing shows the effect on yield, Figure 3 of the drawing shows the yield of polymer with respect to its N. S. T. Examination of Figures 1 and 2 of the drawing indicates that as the accelerator concentration is increased the yield of polymer is increased, but the N. S. T. of the polymer is decreased. Conversely, decrease in accelerator concentration results in the production of higher N. S. T. polymer, but in lower yields. Obviously, a compromise must be made between the desired N. S. T. and the desired yield. Examination of Figure 2 of the drawing shows that as the concentration of silver nitrate accelerator approaches about 200 p. p. m. (about 125 p. p. m. calculated as silver) no significant increase in yield results. Operations therefore, may be conducted employing less than 200 p. p. m. of silver nitrate, the exact quantity being determined in accordance with the desired N. S. T. of the polymer. Figure 3 of the drawing indicates that the yield of polymer begins to fall off when the N. S. T. of the polymer being produced exceeds about 290° C. It will therefore be necessary to sacrifice yield only when a polymer having an N. S. T. of above about 290° C. is desired. The data presented in the figures of the drawings are based on observations made during the homopolymerization of trifluorochloroethylene at a temperature of about 10° C. At lower temperatures higher concentrations of accelerator are required and at higher temperatures lower concentrations of accelerator are required in order to obtain curves corresponding to those presented in the figures of the drawing.

Various modifications and alterations of the procedures of this invention, which will be obvious to those skilled in the art, may be made without departing from the scope of this invention.

Having thus described our invention, we claim:

1. A process for the production of a thermoplastic polymer of trifluorochloroethylene which comprises polymerizing trifluorochloroethylene in a polymerization zone at a temperature above about 0° C. and below 20° C. in the presence of an aqueous-suspension medium containing an alkali persulfate as a promoter and an alkali bisulfite as an activator and a water-soluble silver salt as an accelerator, said water-soluble silver salt being present in an amount within a range between about 1 and about 500 p. p. m. calculated as silver.

2. A process for the production of a thermoplastic polymer of trifluorochloroethylene having an N. S. T. above about 220° C. which comprises polymerization trifluorochloroethylene in a polymerization zone at a temperature above about 0° C. and below 20° C. in the presence of an aqueous-suspension medium containing at least about 0.003 molar concentration of potassium persulfate and sodium bisulfite and an amount of silver nitrate within a range between about 1 and about 500 p. p. m. calculated as silver.

References Cited in the file of this patent

UNITED STATES PATENTS

| | | |
|---|---|---|
| 2,569,524 | Hamilton | Oct. 2, 1951 |
| 2,613,202 | Roedel | Oct. 7, 1952 |